United States Patent [19]

Hennuy et al.

[11] Patent Number: 4,700,050
[45] Date of Patent: Oct. 13, 1987

[54] HEATER CLAMPING ARRANGEMENT FOR ELECTRICALLY HEATED BOILERS

[75] Inventors: Jean Hennuy, En Machon; René Seguret, Limas, both of France

[73] Assignee: SEB S.A., Selongey, France

[21] Appl. No.: 757,082

[22] Filed: Jul. 19, 1985

[30] Foreign Application Priority Data

Jul. 25, 1984 [FR] France ................ 84 11788

[51] Int. Cl.$^4$ .................. H05B 3/00; A47J 27/00
[52] U.S. Cl. .................... 219/438; 219/275; 219/315; 219/385; 219/436; 219/505; 219/521; 219/536; 219/540; 219/542; 338/22 R
[58] Field of Search ............... 219/429, 430, 432–442, 219/315, 540, 542, 536, 534, 271–276, 504, 505, 385, 520, 521; 338/22 R

[56] References Cited

U.S. PATENT DOCUMENTS

| | | | |
|---|---|---|---|
| 1,308,836 | 7/1919 | Bernard | 219/315 |
| 1,381,322 | 6/1921 | Mayall | 219/534 |
| 4,223,208 | 9/1980 | Kleinschmidt et al. | 219/441 X |
| 4,324,974 | 4/1982 | Steiner et al. | 219/441 X |

FOREIGN PATENT DOCUMENTS

| | | | |
|---|---|---|---|
| 22878 | 7/1979 | European Pat. Off. | 219/542 |
| 57171 | 1/1982 | European Pat. Off. | 219/542 |
| 883862 | 5/1943 | France. | |
| 2307430 | 11/1976 | France. | |
| 2423111 | 11/1979 | France. | |
| 166416 | 7/1921 | United Kingdom | 219/438 |

Primary Examiner—Anthony Bartis
Attorney, Agent, or Firm—Young & Thompson

[57] ABSTRACT

The boiler comprises a vessel (1) and a heating element (2) associated with this vessel (1). The vessel (1) comprises at least two compartments which have mutually facing wall members (3, 4) having a profile complementary to the heating element (2) and deformably connected together by a wall part (5). The heating element (2) is disposed between the wall members (3, 4) and a retainer holds the wall members (3, 4) against the heating element (2). A bridge is formed by a wall part (5) which deformably connects the wall members. The retainer includes a top part (9) of the vessel and a split ring (10).

10 Claims, 7 Drawing Figures

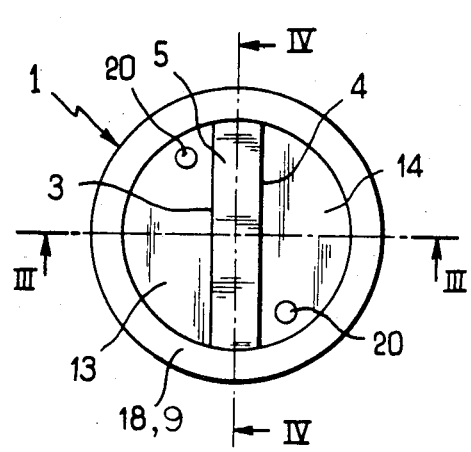
FIG_1
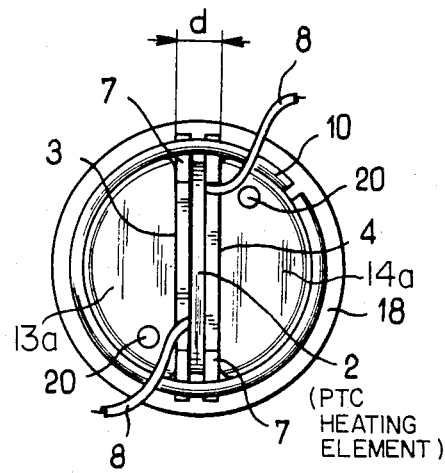
FIG_2
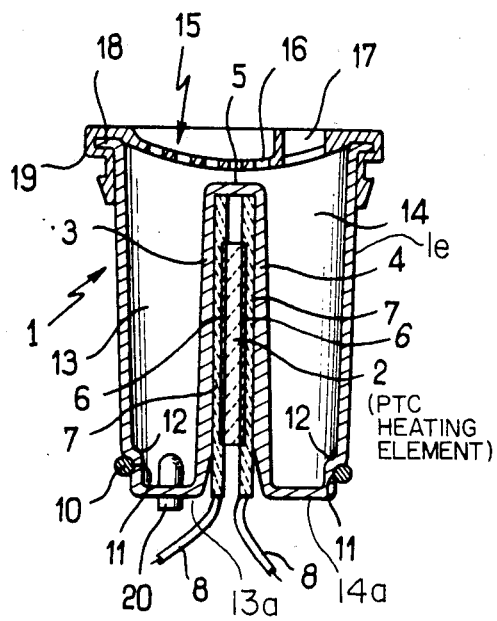
FIG_3
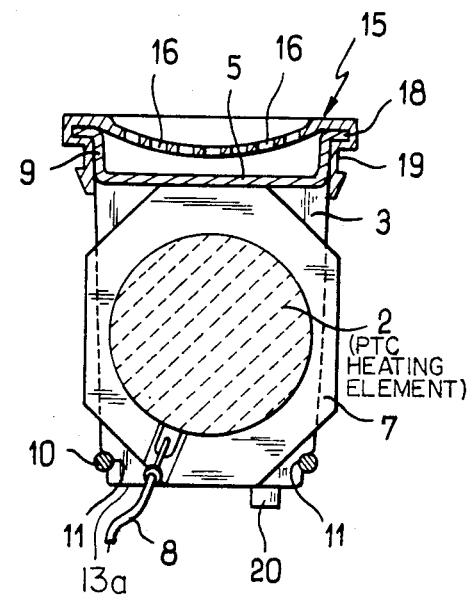
FIG_4

HEATER CLAMPING ARRANGEMENT FOR ELECTRICALLY HEATED BOILERS

The present invention relates to a boiler for a domestic electric appliance, particularly for an apparatus for treating the skin of the face by atomization of a lotion or water vapour, a facial sauna, an inhaler, a towel heater, a molten wax epilator, or a chocolate maker.

Numerous constructions of boilers for domestic electric appliances used for melting or vaporizing widely varying products are already known. It is also known that in order to achieve rapid melting or vaporization it is desirable to have good contact between the heating element and the vessel of the boiler.

In existing appliances the heating element is held applied either against the bottom of the vessel or against the side wall. In either case the heating element is in contact with the vessel only by one of its faces and part of the heat produced by the heating element is therefore lost. In addition, in the case of a heating element disposed against the side wall, this arrangement increases the width of the appliance, particularly as it is generally necessary to provide cladding insulating the outside of the appliance.

It is also known to dispose the heating element between two parts of the vessel. In particular, French Pat. No. 883,862 describes a boiler comprising two parts of the vessel which are bolted together. This type of construction nevertheless entails the risk of leaks when the boiler has been subjected to alternate heating and cooling which results in play between the two parts.

One aim of the present invention is to propose a boiler for domestic electric appliances which has high heating power despite small dimensions.

In order to achieve this aim, a domestic electric appliance boiler is provided which comprises a vessel composed of at least two mutually facing wall members. The profiles of the wall members are complementary to a heating element disposed therebetween. The wall members are connected together by a deformable wall part forming a bridge and are held against the heating element by a retainer means.

Thus, through the deformation of the wall part which forms a bridge, the heating element is held in contact with the wall of the vessel over a large part of its surface, and high heating power is obtained with small dimensions.

According to one advantageous version of the invention the retainer means comprises a split ring of spring material, which is preferably disposed in a retaining groove extending over at least a part of the periphery of the vessel, while the vessel has a shoulder directed inwards in the zone where the retainer means are applied. Thus, very effective clamping is achieved without increasing the outside dimensions of the boiler.

According to another aspect of the invention the boiler is provided at the top with a grid for the distribution of the product which is to be heated. Thus, the product to be heated is distributed regularly on each side of the arrangement of wall members in contact with the heating element, and the product is therefore heated very rapidly.

In one advantageous version the vessel of the boiler is provided with a flange, and the distribution grid covers this flange and is made of an elastic material. The distribution grid thus also serves as a seal in relation to that part of the apparatus on which the boiler is mounted.

Other characteristics and advantages of the invention will emerge from the description of non-limitative examples given below with reference to the accompanying drawings, in which:

FIG. 1 is a top plan view of a boiler according to the invention, without the distribution grid;

FIG. 2 is a view from below of the boiler according to the invention;

FIG. 3 is a view in section on the line III—III in Fig. 1, with the distribution grid;

FIG. 4 is a view in section on the line IV—IV in FIG. 1, with the distribution grid;

Figure 5:
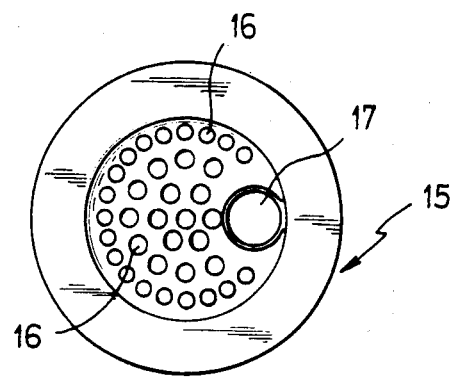
FIG. 5 is a top plan view of the distribution grid according to the invention.

Referring to FIGS. 1 to 4, the boiler comprises a vessel 1 and a heating element 2 associated with it. According to the invention, the vessel 1 comprises at least two wall members 3, 4 facing one another and having a profile complementary to the heating element, these wall members being deformably connected together by a wall part 5 forming a bridge between the mutually facing wall members 3, 4.

In the embodiment illustrated the heating element 2 is a resistor having a positive temperature coefficient (PTC) and in the form of a disc disposed between two flat conductor electrodes 6, which in turn are framed between electrically insulating, thermally conductive plates 7. The flat electrodes 6 are connected to supply leads 8.

The heating element is thus disposed between the wall members 3, 4, which are held against the heating element by retainer means consisting on the one hand of the top part 9 of the elastically deformable vessel, and on the other hand a split ring 10 made of a spring material, for example a spring steel, and disposed at the bottom of the vessel in a groove 11 formed in an inwardly directed shoulder 12 provided in the zone where the split ring 10 is applied.

It will be understood that if the material used to make the vessel 1 is a highly elastic material, it may in some cases be unnecessary to provide a split ring 10. In this case, in fact, it will be possible to provide between the mutually opposite faces of the wall members 3 and 4 a distance d which, in the position of rest, is shorter than the thickness of the stack comprising the heating elements 2, the electrodes 6, and the insulating plates 7, these components being placed in position by force and held in the desired position by the force resulting from the elasticity of the wall part 5 and the top 9 of the vessel. Other retainer means may also be used, for example an unsplit ring driven by force over the base of the vessel after the heating element 2 has been placed in position.

With a boiler of about 35 cubic centimeters made of aluminium and equipped with a circular disclike ceramic resistor of a diameter of about 3 centimeters and a thickness of 3 millimeters, with a power of 200 watts and disposed between two flat electrodes 6 with a thickness of a few tenths of a millimeter and alumina plates 7 of a thickness of about 2 millimeters, it has been possible to boil water within 2 minutes.

In the case of the embodiment illustrated in FIGS. 1 to 4, the vessel 1 is substantially cylindrical and the wall members 3, 4 are disposed parallel to a diameter, so that they form a substantially diametrical hollow boss extending inside the vessel from the bottom of the latter. Widely varying arrangements can obviously be adopted; in particular, the wall members 3, 4 enclosing the heating element may extend transversely from the side wall. Moreover, as shown in FIGS. 6 and 7, it is possible to dispose a plurality of heating elements inside the same vessel.

Figure 6:
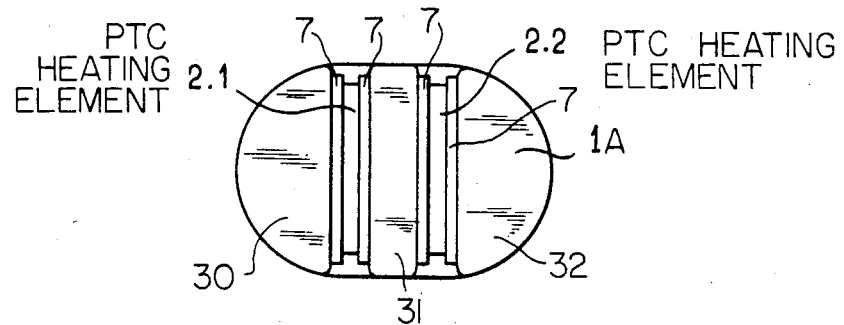
FIG. 6 is a view from below of a first variant of a boiler construction according to the invention.
Figure 7:
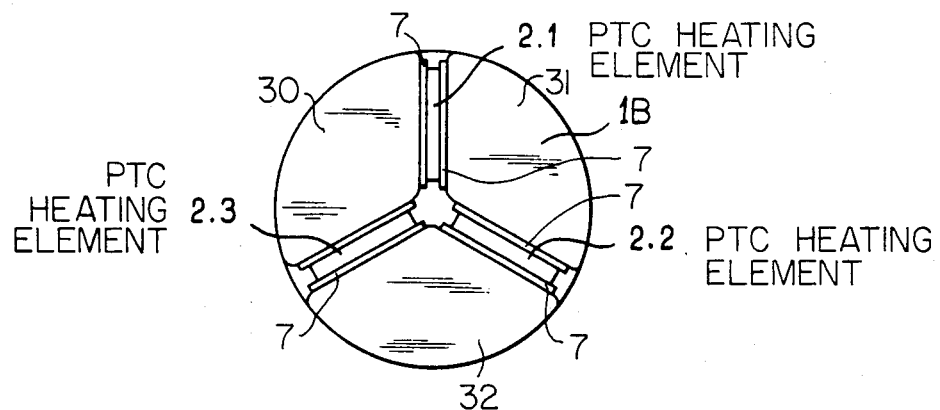
FIG. 7 is a view from below of a second variant of a boiler construction according to the invention.

In the case of FIG. 6, two heating elements 2.1 and 2.2 are disposed parallel to one another, transversely across the vessel 1A, from the bottom of the latter. In the case of FIG. 7, three heating elements 2.1, 2.2 and 2.3 are disposed radially in a star arrangement, all the remainder of the boiler vessel 1B being substantially of the same construction as that described with reference to FIGS. 1 to 4. Elements 30, 31 and 32 represent the bottoms of three commmpartments.

It can be seen in FIGS. 1 and 3 that the wall members 3, 4, which extend diametrically from the bottom of the vessel, delimit, with the outer wall 1e of the vessel, two separate compartments 13, 14 which have bottom walls 13a and 14a. During the filling of the vessel 1, it may happen that the product to be heated, for example water, will be poured into only one of the compartments, and wall members 3, 4 are therefore preferably provided which have a height less than the total height of the vessel 1, so that the product can flow into the second compartment when the first has been filled.

Moreover, in order to achieve effective heating, it is desirable that the two compartments should be filled to the same level. It is therefore advantageous to dispose at the top of the boiler a distribution grid 15 (FIGS. 3, 4, and 5) provided with a series of small holes 16, for example of the order of 2 millimeters in diameter for a boiler which is to be used with water. The small diameter of the holes 16 sets up resistance to flow, and the water poured onto the grid is therefore distributed over the entire surface of the latter before flowing off, practically equally, into the compartments 13 and 14.

Because of the small diameter of the holes 16, there is a risk that the phenomenon of capillarity will prevent the air contained in the vessel 1 from escaping, thus stopping the flow through the grid 15. In order to avoid this phenomenon, it is preferable to provide an escape opening 17 for the air contained in the vessel 1.

In a preferred embodiment the vessel 1 is provided with a flange 18 and the distribution grid 15 covers this flange and is made of an elastic material, for example an elastomer. Thus, when the boiler is placed in position in the domestic appliance, the grid 15 provides a seal relative to that part (not shown) of the apparatus which is disposed above the boiler, for example a steam distributor funnel.

In the embodiment illustrated in FIGS. 3 and 4, the periphery 19 of the grid 15 is profiled to form a fluidtight seal around the flange of the vessel. Thus the steam can escape only through the apertures 16 and 17, so that it can be channelled for its intended use.

For the purpose of fixing the boiler on a base (not shown), the bottom of the vessel 1 is provided with hollow bosses 20 in which screws can be fastened.

The invention is obviously not limited to the embodiment described above, and constructional modifications may be made to it.

In particular, the heating element can be of cylindrical shape and the wall members 3, 4 will then preferably have the form of two half-shells.

It is obviously possible to provide the usual accessories on the boiler, such as temperature control detectors, earthing lugs, or a nonstick lining inside the vessel.

We claim:

1. Boiler for a domestic appliance comprising: a vessel (1) including means defining at least two side-by-side compartments (13, 14), said compartments each having a bottom wall (13a, 14a), an outer side wall means and an inner side wall member (3, 4); the inner side wall members of each pair of side-by-side compartments being disposed in spaced opposed relationship; a heating element (2) disposed between and in contact with said opposed inner side wall members (3, 4) of each pair of side-by-side compartments; wherein said opposed inner wall members of each pair of side-by-side compartments are connected together only at their upper edges by a deformable wall part (5) forming a bridge therebetween, and said wall members have a profile which is complementary to said heating element and are held against said heating element by retainer means (9, 10) associated with said side-by-side compartments.

2. Boiler according to claim 1, wherein the retainer means comprise the inherent elasticity of the bridge and the upper portion of the outer side wall means of each compartment.

3. Boiler according to claim 1, wherein the retainer means comprise a split ring (10) of spring material around the bottom portion of the vessel.

4. Boiler according to claim 3, wherein the vessel (1) is provided on at least a part of its periphery with a groove (11) retaining the split ring (10).

5. Boiler according to one of claim 3 wherein the vessel (1) has an inwardly directed shoulder (12) in the zone in which the split ring (10) is applied.

6. Boiler according to claim 1 wherein the heating means (2) is a resistor having a positive temperature coefficient and the form of a disc disposed between two flat conductive electrodes, which in turn are framed by electrically insulating, thermally conductive plates (7).

7. Boiler according to claim 1, wherein the vessel is provided at its top with a grid (15) for distributing to the compartments the product which is to be heated.

8. Boiler according to claim 7, wherein the distribution grid (15) has an escape open- (17) for the air contained in the vessel (1).

9. Boiler according to claim 7 wherein the top part (9) of the vessel (1) has a flange (18) and in that the distribution grid (15) covers this flange and is made of an elastic material.

10. Boiler according to claim 9, wherein the periphery (19) of the distribution grid is profiled to form a fluidtight seal around the flange (18) of the vessel (1).

* * * * *